Patented Nov. 15, 1938

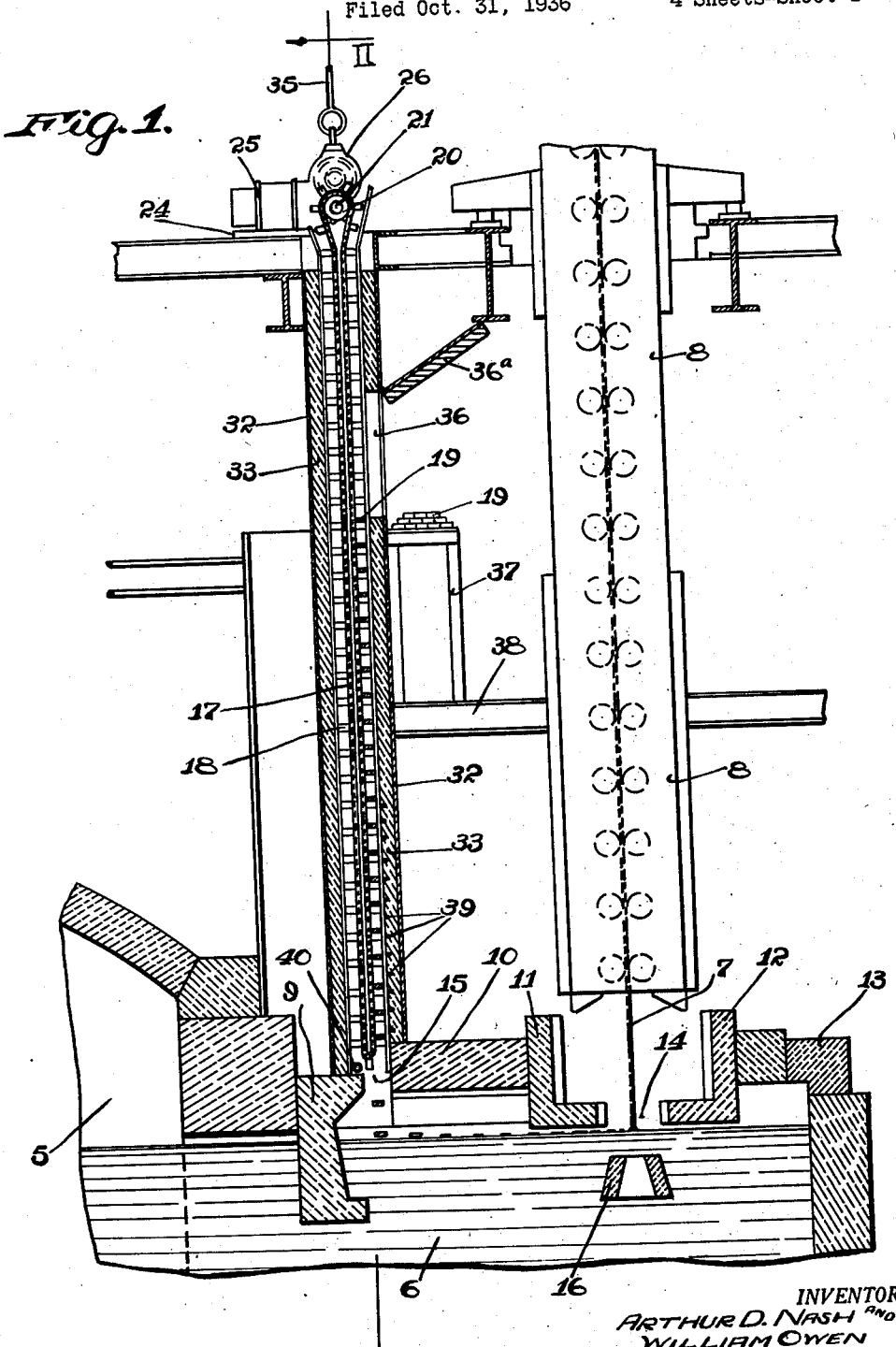

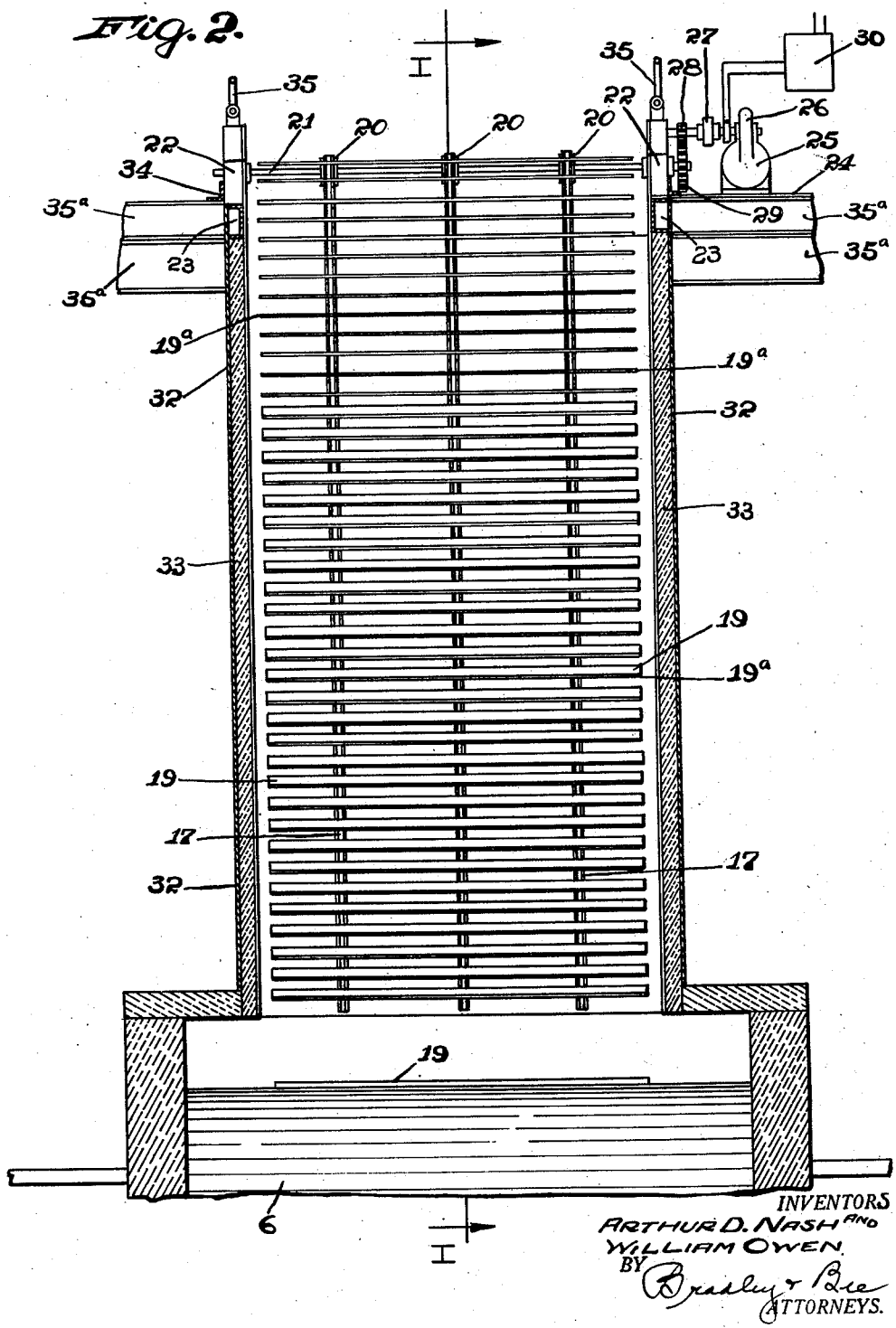

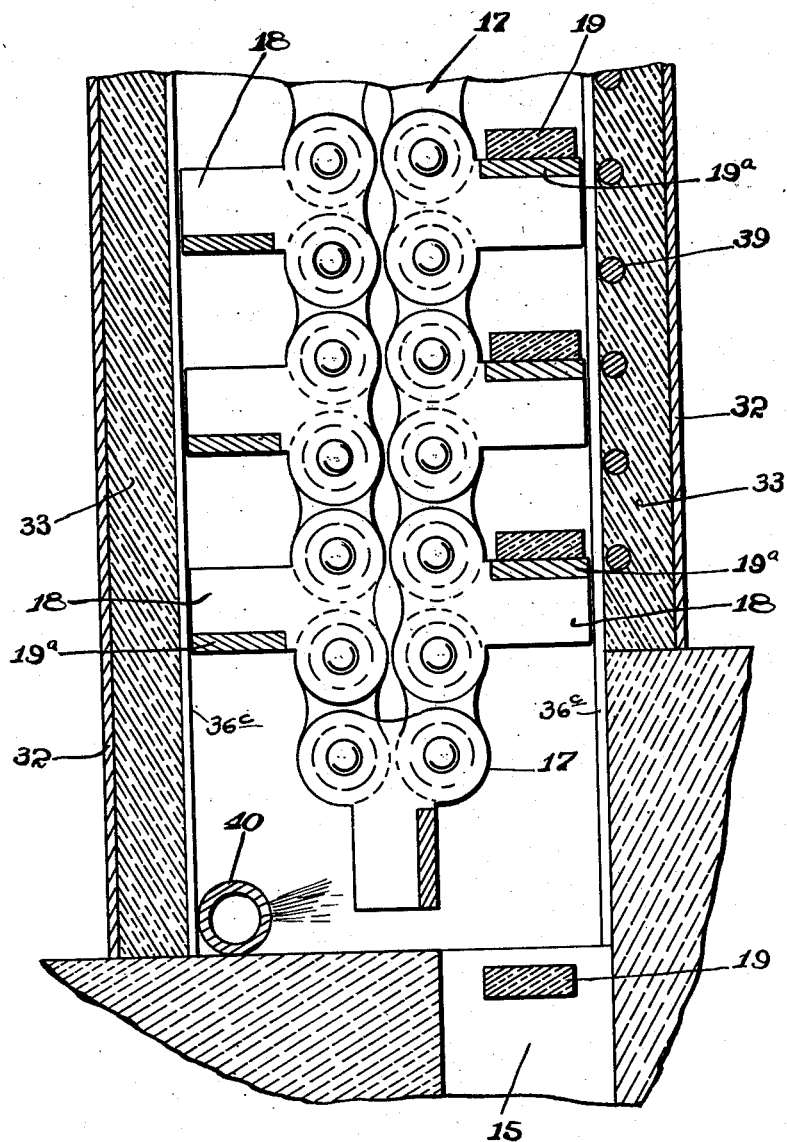

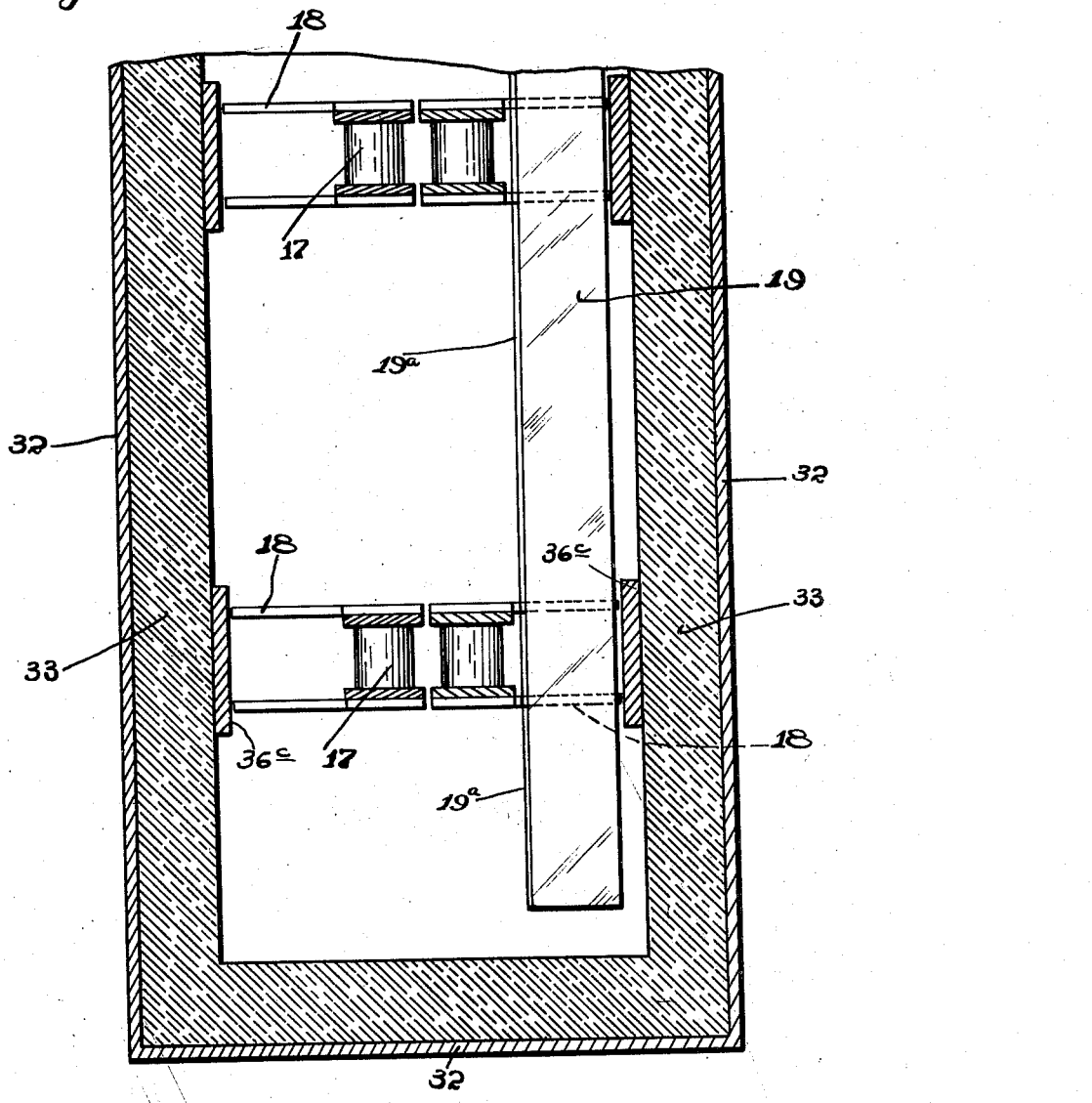

2,137,116

UNITED STATES PATENT OFFICE 2,137,116

APPARATUS FOR MAKING SHEET GLASS

Arthur D. Nash, Sewickley, and William Owen, Pittsburgh, Pa., assignors to Pittsburgh Plate Glass Company, a corporation of Pennsylvania Application October 31, 1936, Serial No. 108,600

6 Claims. (Cl. 49—17)

The invention relates to an apparatus for making sheet glass and involves a modification of the process and apparatus of the application of Arthur D. Nash, Serial No. 91,066, filed July 17, 1936. It relates primarily to an improved means for supplying a layer of colored glass to a bath of clear glass so that the sheet drawn or flowed from the bath consists of two layers, one of clear glass and the other of colored glass. In the application above referred to, the colored glass or frit is supplied to the bath of clear glass in divided or crushed form, while the present invention involves the use of strips or bars of colored glass which may be cut from sheets of glass or drawn in the form of rods and which are fed in timed relation, so that when fused, the colored glass thus provided spreads out on the surface of the bath to form a continuous layer. This gives a somewhat smoother surface than that produced when crushed glass is used to provide the colored layer. In so far as the apparatus is concerned, the invention has for its principal objects the provision of improved means for feeding the colored strips or bars uniformly to the bath in a safe and convenient manner, and for preheating them, so as to prevent breakage and to insure their more rapid melting after they reach the bath. The invention is illustrated in connection with the production of window glass by a drawing process, but it will be understood the procedure is equally applicable to the production of plate glass wherein the sheet produced is flowed or otherwise withdrawn from a tank and sized as illustrated and described in the Nash application referred to above. One embodiment of the apparatus is illustrated in the accompanying drawings, wherein:

Figure 1 is a vertical section through the apparatus on the line I—I of Fig. 2. Fig. 2 is a vertical section on the line II—II of Fig. 1. Fig. 3 is an enlarged detail section through a portion of the apparatus. And Fig. 4 is a transverse section through the portion of the construction shown in Fig. 3.

Referring first to the general arrangement 5 is the end of a glass melting tank of the regenerator type, and 6 is a forehearth from which the glass sheet 7 is drawn continuously through the Fourcault leer 8, this type of leer being well known in the art. The glass sheet on emerging from the leer is cut into sections of suitable length. The top of the forehearth is covered by the refractory members 9, 10, 11, 12 and 13 which are arranged so as to provide two openings 14 and 15 for the drawing of the sheet 7 and for the application of strips of colored glass to the surface of the bath beneath the opening, as later described. The usual draw bar 16 is provided beneath the line of draw of the glass sheet, while the lower portion of the member 9 acts as a skimmer for the glass passing from the tank 5 to the forehearth 6.

Mounted above the opening 15 is apparatus for delivering successive bars of colored glass to the surface of the bath in the forehearth, such bars melting as they move forward along the bath to the line of draw so that the area of the bath which is incorporated in the sheet is provided with a film of glass which may be of any desired color. Due to the withdrawal of the glass to form the sheet 7, the surface glass on either side of the line of draw has a slow movement relative to the body of glass therebeneath in a direction toward the line of draw. The sheet is thus composed largely of surface glass drawn from the bath in the forehearth, although a small amount of glass which is incorporated in the sheet is supplied to the center portion thereof by a vertical flow from the body of glass directly beneath the line of draw. While the strips of colored glass, which are fed to the surface of the bath, are spaced apart a substantial distance when they are first supplied to the bath, the glass constituting such strips quickly fuses and spreads out over the surface of the bath, so that by the time the colored layer reaches the base of the sheet 7, the various bands of colored glass have united, thus giving a continuous coating of colored glass upon the sheet 7. The colored glass is preferably of a composition closely approximating that of the clear glass bath, so that the coefficient of expansion of the two glasses is substantially the same, thus avoiding any tendency of such glasses to separate, as would be the case if one glass had a different coefficient of expansion from the other. The colored glass as thus provided upon the sheet also has the same weathering capacity as the clear glass, so that the colored surface is permanent upon exposure despite the fact that it is very thin.

The glass strips are supplied at timed intervals by means of an endless carrier or conveyor having one flight which moves downwardly and carries the strips to a point adjacent the opening 15 and having a second flight which moves upwardly passing around sprockets at the top of the device. As shown in Figs. 1 and 2, the endless carrier is made up of three chains 17, 17, 17 of link formation, as indicated in Fig. 3, provided with supporting wings 18 for carrying the colored strips 19, such wings being formed integrally with the side bars which connect the pivots of the chain. As later described, heating means are provided adjacent the lower end of the carrier for bringing the strips to a relatively high temperature before their transfer to the glass bath; and in order to prevent the glass strips from sagging intermediate the chains, the wings 18 are preferably provided with transverse metal strips 19a of heat resisting metal, such as nickel chromium, which bridge the spaces between the wings and support the strips 19 throughout their length.

The chains 17 pass at their upper ends around the three sprockets 20, 20, 20 carried upon the shaft 21, such shaft being journalled at its ends in a pair of standards 22, 22 mounted upon channels 23, 23 constituting a part of the casing for the carrier as later described. Projecting laterally from one of the channels 23 and carried thereby is a plate or bracket 24 upon which is mounted the motor 25 for driving the carrier. This motor operates through suitable reduction gearing in the casing 26 and through the magnetic clutch 27 to drive a pinion 28, and such pinion meshes with a gear 29 on the end of the shaft 21, thus providing for the drive of the carrier at a suitable speed for feeding the bars of colored glass downward to the molten bath beneath the opening 15. The feed of the carrier is necessarily very slow and in order to take care of this situation, the operation of the carrier by the motor is preferably made intermittent. This is accomplished by the use of a time relay 30 which controls a solenoid operating the magnetic clutch 27. Time relays of this kind are well known in the art and can be easily regulated to give the carrier any desired speed. As each of the glass strips will provide a coloring film for the glass 7 which is several feet in length and the speed of draw of the sheet 7 for one quarter inch glass is not in excess of 20 inches per minute, it will be apparent that the time interval between the feed of strips to the bath is of considerable length. It will also be seen that this relatively long period between the time the strips are deposited in the glass bath and their incorporation into the sheet 7 is such that ample time is provided for the colored glass to melt and spread over the bath.

The endless carrier is mounted in a casing which extends its complete length, such casing being made up of the pairs of plates 32, 32 which are secured at their upper ends to the channels 23, 23 and to a pair of similar channels which form a rectangular front at the top of the casing. These plates are provided on their inner sides with layers 33 of insulating material and the casing is hung from its upper end by angles 34 (Fig. 2) which are secured to the standards 22 and rest upon the beams 35a constituting a part of the superstructure of the building in which the apparatus is housed. Cables 35, 35 are attached to the standards 22, 22 at the top of the casing construction, such cables passing over suitable pulleys and being connected with lifting hoists (not shown) so that when desired, the entire unit consisting of the casing, the carrier and the drive means may be lifted bodily and removed. One side of the casing is open, as indicated at 36 (Fig. 1) and the feed of bars to the carrier occurs at this point. A door 36a (Fig. 1) is provided for closing this opening after a section of the carrier has been loaded with the colored strips. As shown, a table 37 is provided adjacent the opening which carries a supply of blanks and this table is located upon a floor or balcony 38, so that blanks may be conveniently conveyed to the table from time to time as required. Pairs of metal strips 36c (Figs. 3 and 4) are provided on the inner sides of the insulation, such strips acting as guide and wear plates for the conveyor chains. In order to prevent breakage of the blanks when they are delivered from the carrier to the molten bath and in order to cause them to melt more readily in the bath, it is desirable to heat them to a point approximating the softening point, before their delivery from the carrier. The lower end of the casing in which the carrier is mounted is heated to a relatively high point by the hot gases which pass from the space above the molten bath to the casing through the opening 15, but this heating effect is preferably supplemented by the use of electric heating means (Fig. 1) in the form of a coil 39 of resistance material suitably connected to a source of electric current. This heating is also further supplemented by the use of a gas burner in the form of the pipe 40 (Fig. 3) which is located at the extreme lower end of the casing and is perforated to permit of the passage of gases of combustion toward the lower end of the carrier. By this means the glass strips are brought to a temperature of approximately 1000 to 1200 degrees before they are released from the carrier and dropped into the bath. It will be noted that the apparatus has flexibility of operation in that the production of a colored sheet may be discontinued at any time or a shift may be made from one color to another by merely substituting blanks of different colors. Further that the main apparatus for producing the sheet 7 is of a standard window glass type, so that when the unit for delivering the colored glass is removed or its operation is discontinued, the production of standard window glass may be resumed with only a delay period sufficient to free the bath from any traces of colored glass. In practice, the colored glass delivered to the surface of the bath remains at the surface, and is not dissipated through the forehearth, so that the period of delay in shifting from colored to clear glass is relatively short. The colored glass remains on the surface of the clear glass bath because of the surface tension of such bath and because it has a specific gravity which is no higher than that of the bath.

The strips of colored glass are preferably of a length less than the width of the tank so that such glass will not in its forward movement with the surface of the bath spread out sufficiently to contact with the side walls of the tank. This is important, as otherwise the collection of colored glass on the side walls of the tank would cause some discoloration in the bath for a long period after the use of the color has been discontinued. To be on the safe side, it is desirable that the width of the colored portion of the sheet should terminate short of the side edges of the sheet a distance such that the edge holding devices of the sheet (such as the edge rolls) shall engage uncolored strips along such side edges. The sheet drawn will, therefore, preferably have clear glass margins which may range from three to five inches in width.

What we claim is:
1. In combination with a glass tank adapted to carry a molten bath and means for withdrawing the surface glass therefrom continuously in the form of a sheet, a carrier for feeding a series of glass strips of a composition different from that of said bath to a delivery point adjacent the point at which said sheet is withdrawn with the strips in parallel with the line of withdrawal of the sheet, and means for operating the carrier so that the glass strips are discharged in series therefrom onto the surface of the bath.

2. In combination with a glass tank adapted to carry a molten bath and means for withdrawing the surface glass therefrom continuously in the form of a sheet, said tank having a cover with an opening therethrough adjacent the point at which the sheet is withdrawn, a downwardly moving carrier above the opening for carrying a series of strips of glass of a color different from that of the bath, and means for operating the carrier so that the glass strips are discharged in series therefrom onto the surface of the bath.

3. In combination with a glass tank adapted to carry a molten bath and means for withdrawing the surface glass therefrom continuously in the form of a sheet, said tank having a cover with an opening therethrough adjacent the point at which the sheet is withdrawn, a downwardly moving carrier above the opening for carrying a series of strips of glass of a color different from that of the bath, means for heating the carrier and the glass strips carried thereby, and means for operating the carrier so that the glass strips are discharged in series therefrom onto the surface of the bath.

4. In combination with a glass tank adapted to carry a molten bath and means for withdrawing the surface glass therefrom continuously in the form of a sheet, said tank having a cover with an opening therethrough adjacent the point at which the sheet is withdrawn, an endless carrier above the opening for carrying a series of strips of glass of a color different from that of the bath, and means for operating the carrier so that the glass strips are discharged in series therefrom onto the surface of the bath.

5. In combination with a glass tank adapted to carry a molten bath and means for withdrawing the surface glass therefrom continuously in the form of a sheet, said tank having a cover with an opening therethrough adjacent the point at which the sheet is withdrawn, an endless vertical carrier above the opening for carrying a series of strips of glass of a color different from that of the bath, a casing enclosing the carrier, means in the casing for heating the carrier and glass strips carried thereby, and a motor supported on the casing for driving the carrier so that the glass strips are discharged in series therefrom onto the surface of the bath.

6. In combination with a glass tank adapted to carry a molten bath and means for withdrawing the surface glass therefrom continuously in the form of a sheet, said tank having a cover with an opening therethrough adjacent the point at which the sheet is withdrawn, an endless vertical carrier above the opening for carrying a series of strips of glass of a color different from that of the bath, a casing enclosing the carrier, means in the casing for heating the carrier and glass strips carried thereby, and a motor supported on the casing for driving the carrier so that the glass strips are discharged in series therefrom onto the surface of the bath, said casing, carrier and motor being formed as a single movable unit so that it may be shifted bodily to and from position over said opening.

ARTHUR D. NASH.
WILLIAM OWEN.